United States Patent
Reinger et al.

(10) Patent No.: US 11,319,257 B2
(45) Date of Patent: May 3, 2022

(54) CERAMIC HEAT SHIELDS HAVING SURFACE INFILTRATION FOR PREVENTING CORROSION AND EROSION ATTACKS

(71) Applicant: Siemens Aktiengesellshaft, Munich (DE)

(72) Inventors: Marco Reinger, Lauchringen (DE); Werner Stamm, Mülheim an der Ruhr (DE)

(73) Assignee: SIEMENS ENERGY GLOBAL GMBH & CO. KG

( * ) Notice: Subject to any disclaimer, the term of this patent is extended or adjusted under 35 U.S.C. 154(b) by 0 days.

(21) Appl. No.: 16/339,727

(22) PCT Filed: Sep. 22, 2017

(86) PCT No.: PCT/EP2017/074063
§ 371 (c)(1),
(2) Date: Apr. 5, 2019

(87) PCT Pub. No.: WO2018/072970
PCT Pub. Date: Apr. 26, 2018

(65) Prior Publication Data
US 2020/0048153 A1 Feb. 13, 2020

(30) Foreign Application Priority Data
Oct. 17, 2016 (DE) ...................... 10 2016 220 246.4

(51) Int. Cl.
*C04B 41/88* (2006.01)
*C04B 41/00* (2006.01)
(Continued)

(52) U.S. Cl.
CPC ............ *C04B 41/88* (2013.01); *C04B 41/009* (2013.01); *C04B 41/4539* (2013.01);
(Continued)

(58) Field of Classification Search
CPC ....... C04B 41/88; C04B 41/87; C04B 41/009; C04B 41/4539; C04B 41/52; C04B 41/89; F23M 5/00; F23R 3/007
See application file for complete search history.

(56) References Cited

U.S. PATENT DOCUMENTS

| 5,154,885 A | 10/1992 | Czech et al. |
| 6,231,692 B1 | 5/2001 | Vogt et al. |
(Continued)

FOREIGN PATENT DOCUMENTS

| DE | 10347701 A1 | 5/2005 |
| DE | 102009045698 A1 | 4/2011 |
(Continued)

OTHER PUBLICATIONS

PCT International Search Report for PCT/EP2017/074063, dated Jan. 4, 2019.

*Primary Examiner* — Michael P Wieczorek
(74) *Attorney, Agent, or Firm* — Schmeiser, Olsen & Watts LLP

(57) ABSTRACT

An improved ceramic heat shield for a gas turbine is provided. The ceramic heat shield has a porous ceramic body and according to the embodiments an infiltration coating that is provided in a surface layer of the porous ceramic body and contains an infiltration coating material designed to gas-tightly seal pores of the ceramic body.

15 Claims, 3 Drawing Sheets

(51) Int. Cl.
  *C04B 41/45* (2006.01)
  *C04B 41/51* (2006.01)
  *C04B 41/89* (2006.01)
  *F23M 5/00* (2006.01)
  *F23R 3/00* (2006.01)
  *C04B 41/52* (2006.01)

(52) U.S. Cl.
  CPC .............. *C04B 41/52* (2013.01); *C04B 41/89* (2013.01); *F23M 5/00* (2013.01); *F23R 3/007* (2013.01); *F23M 2900/05004* (2013.01)

(56) References Cited

U.S. PATENT DOCUMENTS

| | | | |
|---|---|---|---|
| 6,929,852 B2* | 8/2005 | Lane | C04B 41/009 428/304.4 |
| 7,767,305 B1 | 8/2010 | Stewart et al. | |
| 7,985,493 B2* | 7/2011 | Lane | C04B 41/89 428/701 |
| 8,105,683 B2* | 1/2012 | Thompson | C04B 41/5031 428/307.7 |
| 8,481,152 B2* | 7/2013 | Shuba | C10J 3/72 428/305.5 |
| 2002/0157738 A1 | 10/2002 | Burgel et al. | |
| 2003/0032545 A1 | 2/2003 | DiChiara, Jr. | |
| 2003/0207151 A1 | 11/2003 | Stamm | |
| 2004/0011439 A1 | 1/2004 | Corrigan et al. | |
| 2005/0053892 A1* | 3/2005 | Shiromizu | C04B 41/009 432/251 |
| 2009/0181257 A1 | 7/2009 | Grote | |
| 2012/0156370 A1 | 6/2012 | Tontrup et al. | |
| 2020/0109088 A1 | 4/2020 | Lange et al. | |

FOREIGN PATENT DOCUMENTS

| | | |
|---|---|---|
| EP | 0412397 A1 | 2/1991 |
| EP | 0486489 A1 | 5/1992 |
| EP | 1285899 A2 | 2/2003 |
| EP | 1306454 A1 | 5/2003 |
| EP | 1319729 A1 | 6/2003 |
| EP | 1204776 | 6/2004 |
| EP | 1443033 A1 | 8/2004 |
| EP | 1741980 A1 | 1/2007 |
| EP | 1975581 A1 | 10/2008 |
| WO | 9967435 A1 | 12/1999 |
| WO | 0044949 A1 | 8/2000 |
| WO | WO2013021354 A2 | 2/2013 |
| WO | WO2014168921 A1 | 10/2014 |
| WO | 2018011126 A1 | 1/2018 |

\* cited by examiner

CERAMIC HEAT SHIELDS HAVING SURFACE INFILTRATION FOR PREVENTING CORROSION AND EROSION ATTACKS

CROSS-REFERENCE TO RELATED APPLICATIONS

This application claims priority to PCT Application No. PCT/EP2017/074063, having a filing date of Sep. 22, 2017, which is based on German Application No. 10 2016 220 246.4, having a filing date of Oct. 17, 2016, the entire contents both of which are hereby incorporated by reference.

FIELD OF TECHNOLOGY

The following relates to a ceramic heat shield for a gas turbine. On account of the infiltration of a highly porous ceramic surface it is achieved that the porosity of the ceramics on the surface is significantly reduced and corrosive products thus cannot invade. The inner porosity is simultaneously preserved. The service life is increased on account thereof. Additionally, an improved chemical bonding to a further surface protection layer is rendered possible by way of a smoothing of the surface. The service life of the ceramics can yet again be significantly improved on account thereof.

BACKGROUND

The high temperatures (~1873K gas temperature) created in in the operation of gas turbines in the interior of the latter are shielded along the hot-gas path, in particular in the region of the combustion chamber, by ceramic heat shields. The ceramic shields are composed of sintered mullite having an open porosity of 15% to 17%. The ceramic heat shields, on the side thereof that faces the hot gas, display corrosion and erosion during the operational use. This process can be traced back to the corrosion of the mullite contained in the ceramic material, said mullite when in contact with the hot gas being converted to secondary corundum. This secondary corundum in turn has a lower mechanical strength than the surrounding ceramic material and is therefore subtracted by the hot-gas flow. Comparatively large component parts of the structure are exposed herein, until said component parts of the structure are finally released from the surface of the ceramic heat shield and are carried away by the hot gas. The exposed particles can cause damage to the protective coatings of the turbine blades (thermal barrier coatings—TBC), which can lower the service life of the turbine blades.

To protect the bricks, it has been known to date for the hot-gas side of the ceramic heat shields to be provided with a plasma coating from aluminum oxide. Aluminum oxide is significantly more hot-gas stable than mullite but does have significant adhesion problems under the coating conditions mentioned.

The aluminum oxide coating can be applied to the heat shield by a slurry spray method or a flame spray method. A coating of approximately 300 micro-meters in thickness is usually applied herein. An aluminum oxide coating applied by slurry spray methods displays a relatively fine-grain structure which in the operation of the gas turbine has a tendency of post-sintering, crack formation, and premature sanding. By contrast, the coating becomes relatively dense and brittle when a flame spraying method is used, which is why said coating cannot follow the deformations of the ceramic heat shield during the operation of the gas turbine.

Here too, this leads to crack formation and a premature release of the coating. For these reasons, the service life of such aluminum coatings is limited to approximately 8000 operating hours, wherein significantly lower service lives have to be assumed in the case of gas turbines which achieve particularly high hot-gas temperatures. The coating per se represents a further source of particles having the negative effects on the turbine blades described above, and only insufficiently increases the service life of the ceramic heat shields.

SUMMARY

An aspect relates to providing ceramic heat shields having an increased service life.

The following relates to an improvement of the surface state of the ceramic heat shield, so as to prevent the invasion of corrosive products on the one hand, and to enable improved adhesion potentials for additional coatings, on the other hand. The ceramic heat shield possesses a porous ceramic body so as to fundamentally preserve the elongation tolerance of the entire system and according to embodiments of the invention comprises an infiltration coating which is disposed in a surface layer of the porous ceramic body and contains an infiltration coating material which is configured for largely closing pores of the ceramic body on the surface.

The infiltration coating invades the pores of the ceramic body and largely closes the latter such that the hot gas can invade the ceramic heat shield only to a limited extent. On account thereof, a corrosion, or erosion, respectively, of the ceramic material of the porous ceramic body and thus of the heat shield no longer takes place or is at least heavily restricted. No ceramic particles, or fewer ceramic particles, are released from the ceramic heat shield, on account of which correspondingly less damage is caused on the TBC layers of the turbine blades.

The porous ceramic body contains mullite or aluminum oxide or is composed of mullite or aluminum oxide. For example, the material which is produced by Siemens under the name "SiCerm E100" represents a suitable material for the porous ceramic body.

The infiltration material is particularly composed of yttrium aluminum garnet (YAG). The YAG can be produced by way of sol gel or pre-reacted YAG or melt stabilization. $Al_2O_3$, or else aluminum zirconate, or similar systems can likewise be used. As opposed to other compounds, yttrium aluminum garnet (YAG) also has the advantage that the thermal coefficient of expansion is almost identical to that of aluminum oxide. The better the thermal coefficients of expansion of the infiltration coating and of the ceramic body are mutually adapted, the lower the risk of erosion by the effect of hot gas, which is why a combination of aluminum oxide for the porous ceramic body and YAG for the infiltration coating is considered particularly advantageous. The concentration of the slurry/sol is adapted to the pore size. In order for the material to be able to invade the porosity, a particle size of less than 1 μm is targeted, wherein a particle size of 500 nm to 100 nm would be optimal.

The concentration of the infiltration material can decrease from the surface of the ceramic heat shield toward the depth of the heat shield. On account thereof, a continuous transition from the system of the infiltration coating/ceramics toward that of the ceramic body is formed. This is particularly advantageous because the hot-gas attack takes place from the surface of the ceramic heat shield. No barrier layer is in particular formed between the infiltration coating material (YAG, for example) and the material of the ceramic body (corundum, for example), which barrier layer could cause undesirable stresses or inhomogeneities.

The infiltration coating possesses a thickness of at least 400 μm. Lower depths lead to a reduced protection of the ceramic body of the heat shield. The optimal thickness has to be ascertained by means of the real loading conditions of the respective machine type.

The surface layer can extend across an end face of the porous ceramic body and across lateral faces of the porous ceramic body. This represents a further advantage of embodiments of the invention as opposed to conventional coatings, because the latter require an application of typically 200 to 400 micrometers of coating material, on account of which a coating between neighboring ceramic heat shields to date has not been feasible because of the dimensions of the heat shields that have been modified by the coating. By contrast, the infiltration coating of embodiments of the invention invades the porous ceramic body of the heat shield and penetrates the surface layer, on account of which the dimensions of the ceramic heat shield remain unchanged and the lateral faces of the ceramic heat shield that are exposed to sporadically invading hot gas can also be protected.

A second aspect of embodiments of the invention relates to the procedure for producing an infiltration layer.

The embodiments moreover describe a method for producing an improved ceramic heat shield for a gas turbine. The overall process comprises at least the following steps:
  providing a porous ceramic body; and
  generating an infiltration coating in a surface region of the porous ceramic body, wherein the infiltration coating contains an infiltration coating material which enables pores of the ceramic body to be largely closed and inner corrosion attacks to be avoided.

A ceramic heat shield for a gas turbine having an extended service life can be produced by the production method according to embodiments of the invention. The infiltration coating material (YAG) invades the pores of the porous ceramic material and largely closes the latter such that the hot gas that flows in the gas turbine during the operation can invade the ceramic heat shield to only a minimal extent. Chemical processes which lead to an erosion of the heat shields are prevented on account thereof.

In order for the infiltrated brick to be produced, the brick is infiltrated multiple times (depending on the desired penetration depth) under a vacuum of approx. 38 mbar in a vessel. Depending on the number and duration of the immersing procedures, the penetration depth can be varied and controlled up to the complete infiltration of the freely accessible porosity of the combustion chamber brick. The remaining vacant porosity guarantees the further thermal shock stability.

After the infiltration, the surplus slurry remaining on the surface is removed by draining or by means of mechanical wiping. Infiltrations having penetration depths of d<400 μm, and thicknesses up to 600 μm, or else full infiltration, have been achieved in the experiments. The brick is then fired in a subsequent firing procedure, so as to establish a crystalline transition of the YAG and a crystalline compound with the sintered mullite. Various reactive phases and transition phases and YAG dendrites between the mullite and the infiltration slurry are configured herein. The respective structures are illustrated in FIGS. 4a, 4b (refer to the end of the application).

The generating of the infiltration coating particularly comprises, as described above, a step of immersing the porous ceramic body in a suspension containing the infiltration coating material (often referred to as "slurry"). This method of applying the infiltration coating material to the porous ceramic body in the vacuum can be carried out easily and efficiently in an industrial manner, leads to uniform results, and can be scaled to large volumes of heat shields. Immersing herein is understood not only to be moving the porous ceramic body in the provided suspension, but also to be, for example, directing the suspension onto a provided ceramic body such that the ceramic body is at least partially covered by the suspension when stationary or quasi-stationary conditions have arisen (the latter in the case of continuous pumping and discharging of the suspension).

The immersing of the porous ceramic body is carried out for a predetermined temporal duration. The penetration depth of the infiltration coating material into the porous ceramic body and thus the thickness of the infiltration coating is substantially determined by way of the predetermined temporal duration. Comparatively long temporal duration is herein lead to a deeper invasion but slow down the production process. By contrast, in the case of excessively short temporal durations, the infiltration coating material cannot invade the porous ceramic body to a sufficient depth, on account of which the protective effect of the infiltration coating is reduced. Therefore, a predetermined temporal duration in which the thickness of the infiltration coating is to be in the magnitude of 400 micrometers is considered appropriate.

The method according to embodiments of the invention can comprise a step of masking part of a surface of the porous ceramic body prior to immersing the porous ceramic body in the suspension. The masking can be performed, for example, by masking using adhesive strips or by applying wax, or the like. On account thereof, the infiltration coating material can be selectively incorporated in the porous ceramic body, this having a particularly advantageous effect on the material consumption. For example, the rear side of the heat shield that is not exposed to the hot gas can be masked.

The method described here comprises an operative step for producing the suspension. The step of preparing the suspension can comprise a step of melting and stabilizing the melt of the infiltration coating material. The step of preparing the suspension particularly comprises a step of grinding the infiltration material to the sub-micrometer range. The infiltration material thus finely ground can invade the pores of the ceramic body and close the latter. The size of the particles of the infiltration coating material has to be smaller by a multiple in order for the suspension to be able to invade and close the pore ducts; said particles also have an influence on the penetration depth into the porous ceramic body. The concentration of the infiltration coating material in the surface layer of the ceramic heat shield can be established by way of the respective content of the ground infiltration coating material in the suspension.

A step of firing the porous ceramic body is carried out after the step of immersing into the suspension. The infiltration coating material is durably connected to the porous ceramic body on account of the firing. The step of firing can advantageously correspond to a firing already used to date in the production of ceramic heat shields. This means that known manufacturing methods for ceramic heat shields can be simply extended by a step of immersing the ceramic body in the suspension carried out prior to the firing of the ceramic heat shield, wherein the tools and methods used to date can otherwise be continued to be used in an unmodified manner.

The firing can be performed at a temperature of at least 1250 degrees Celsius. In general, temperatures above approximately 1450 degrees Celsius can be used. In the manufacturing of ceramic heat shields, firing temperatures above 1500 degrees Celsius are usual, so that said conventional firing procedures meet the requirements of the method according to embodiments of the invention without modification. The firing can be performed for a temporal duration of approximately two hours.

The step of providing the porous ceramic body can comprise steps of mixing a ceramic body raw compound, of shaping, of setting, and of drying. This corresponds to commonplace production steps for conventional ceramic heat shields such that existing production processes can be adapted to embodiments of the invention in a simple manner.

The method can comprise steps of weighing the ceramic body so as to monitor the progress or success of the method. For example, a weight of the ceramic body before and after immersing in the suspension can be compared, so as to determine the quantity of the infiltration material incorporated into the ceramic body. This ceramic body can optionally be re-immersed in the suspension when the weight increase is lower than expected. A weight modification by a final firing procedure can likewise be monitored. The ceramic body can thus be weighed before and after the firing. The real increase in terms of mass on account of the incorporation of the infiltration coating can be determined by the comparison of weights of the ceramic body determined before the immersing and after the firing. All said data, optionally together with the production parameters, can be detected and stored for each heat shield manufactured in this manner. In this way, the production method according to embodiments of the invention can be optimized based on the wear of the individual heat shields established in the course of the operation.

The embodiments moreover relate to a refurbishment method comprising the following steps:

removing at least one existing ceramic heat shield from a gas turbine; and installing a ceramic heat shield according to embodiments of the invention in the gas turbine.

The process according to embodiments of the invention can also be performed after surface cleaning of an operationally stressed component.

Revision work of gas turbine components or entire gas turbines, also referred to as "refurbishment", is carried out as a matter of routine. An already existing gas turbine can be equipped with the ceramic heat shields according to embodiments of the invention in the context of such a procedure. In the context of the refurbishment method according to embodiments of the invention it is in particular to be considered that, while using the production method according to embodiments of the invention for a heat shield, the heat shield that has been removed from the gas turbine to be refurbished is provided with an infiltration coating and said heat shield to be installed in the same gas turbine from which said heat shield has been removed, or else to be installed in another gas turbine.

Coating of the Infiltrated Surface

The infiltrated surface has a very smooth surface, and the existing cracks are largely smoothed. The service life can even be increased on account of the additional coating with a protective coating. The same elements as mentioned above can be applied herein as a protective layer. Various methods such as ARC sputtering, PVD evaporation, or else coating using the plasma gun, can be used as a coating method. However, attention has to be paid to the bonding of the outer layer to the substrate containing potentials for chemical interaction in order for the required bonding to be obtained.

BRIEF DESCRIPTION

Some of the embodiments will be described in detail, with reference to the following figures, wherein like designations denote like members, wherein.

DETAILED DESCRIPTION

Figure 1:
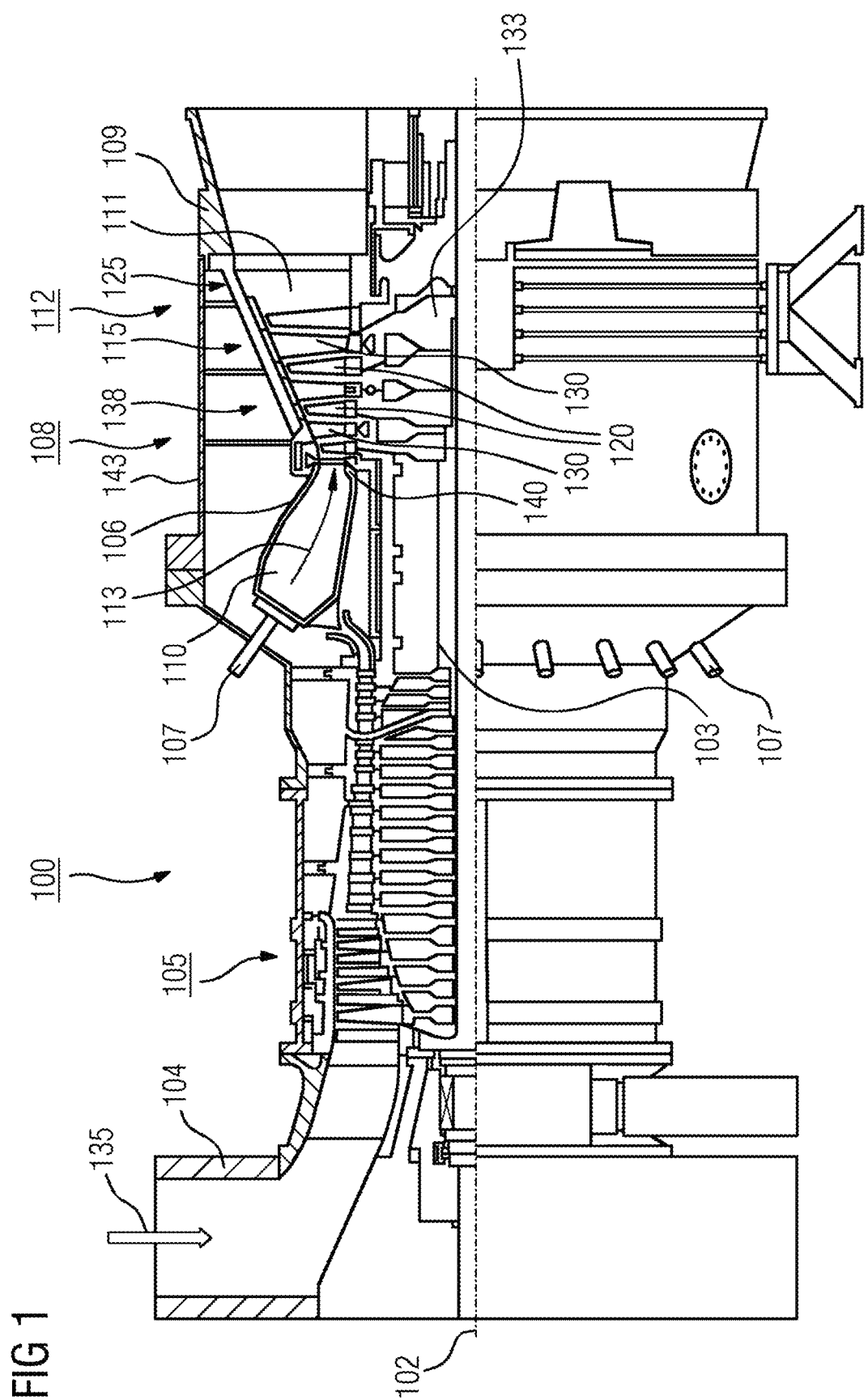
FIG. 1 shows an exemplary gas turbine 100 in a partial longitudinal section.

FIG. 1 in an exemplary manner shows a gas turbine 100 in a partial longitudinal section. The gas turbine 100 in the interior has a rotor 103 that is mounted so as to be rotatable about a rotation axis 102, said rotor 103 having a shaft 101 and also referred to as a turbine rotor.

An intake housing 104, a compressor 105, a combustion chamber 110, in particular an annular combustion chamber, which is, for example, torus-like, having a plurality of coaxially disposed burners 107, a turbine 108, and the exhaust housing 109 are successively disposed along the rotor 103.

The annular combustion chamber 110 communicates with a hot-gas duct 111 which is, for example, annular. For example, four turbine stages 112 disposed in series form the turbine 108 in said hot-gas duct 111.

Each turbine stage 112 is formed from two blade rings, for example. Viewed in the flow direction of an operating medium 113, a guide vane row 115 in the hot-gas duct 111 is followed by a row 125 formed from rotor blades 120.

The guide vanes 130 herein are fastened to an internal housing 138 of the stator 143, whereas the rotor blades 120 of a row 125 are attached to the rotor 103, for example by means of a turbine disk 133.

A generator or a work machine (not illustrated) is coupled to the rotor 103.

During the operation of the gas turbine 100, air 135 is suctioned through the intake housing 104 and compressed by the compressor 105. The compressed air provided at the turbine-side end of the compressor 105 is guided to the burners 107 and is mixed with a fuel there. The mixture, while forming the operating medium 113, is then combusted in the combustion chamber 110. The operating medium 113 from there flows along the hot-gas duct 111 and passed the guide vanes 130 and the rotor blades 120. The operating medium 113 relaxes on the rotor blades 120 so as to transfer an impulse such that the rotor blades 120 drive the rotor 103 and the latter drives the work machine coupled thereto.

The components exposed to the hot operating medium 113 during the operation of the gas turbine 100 are subjected to thermal loadings. Besides the ceramic heat shields that clad the annular combustion chamber 110, the guide vanes 130 and rotor blades 120 of the first turbine stage 112, when viewed in the flow direction of the operating medium 113, are the most thermally stressed.

To withstand the temperatures prevailing therein, said aforementioned components can be cooled by means of a coolant.

Likewise, substrates of the components can have an oriented structure, that is to say they are monocrystalline (SX structure) or have only longitudinally oriented grains (DS structure).

For example, super alloys based on iron, nickel, or cobalt are used as the material for the components, in particular for the turbine blades 120, 130 and components of the combustion chamber 110.

Such super alloys are known, for example from EP 1 204 776 B1, EP 1 306 454, EP 1 319 729 A1, WO 99/67435, or WO 00/44949.

The blades 120, 130 can have anti-corrosion or antioxidation coatings, for example MCrAlX (M is at least one element of the group iron (Fe), cobalt (Co), nickel (Ni), X is an active element and represents yttrium (Y) and/or silicon and/or at least one element of the rare earths, or hafnium (Hf), respectively). Such alloys are known from EP 0 486 489 B1, EP 0 T86 017 B1, EP 0 412 397 B1, or EP 1 306 454 A1.

A protective aluminum oxide layer (TGO=thermal grown oxide layer) is formed on the MCrAlX layer (as an intermediate layer or as the outermost layer).

A heat insulation layer which is the outermost layer can also be provided on the MCrAlX, said heat insulation layer being composed, for example, of $ZrO_2$, $Y_2O_3$—$ZrO_2$, that is to say that said heat insulation layer is not, or partially, or completely stabilized by yttrium oxide and/or potassium oxide and/or magnesium oxide. The heat insulation layer covers the entire MCrAlX layer.

Figure 2:
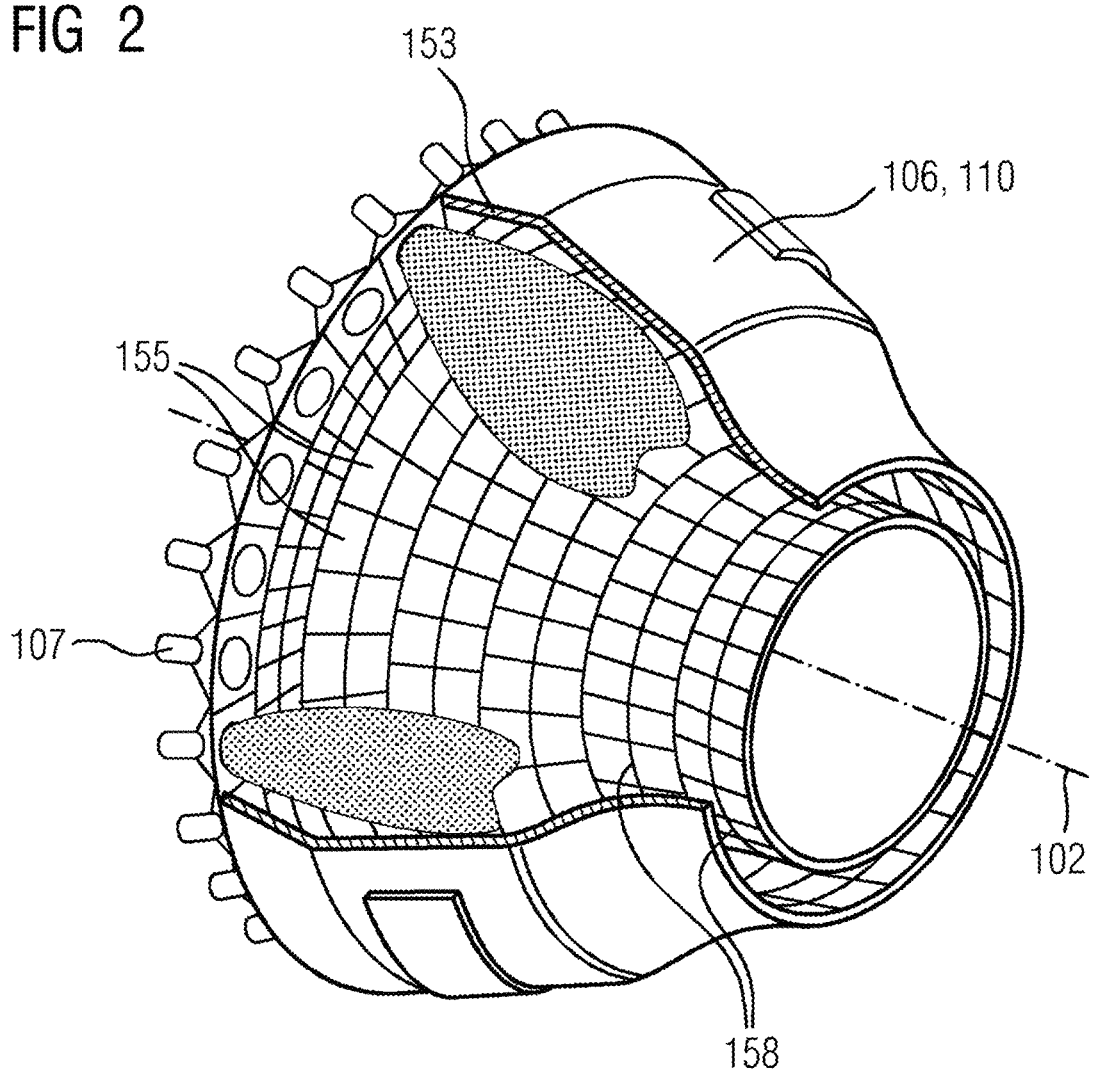
FIG. 2 shows a combustion chamber 110 of a gas turbine.

FIG. 2 shows a combustion chamber 110 a gas turbine. The combustion chamber 110 is designed, for example, as a so-called annular combustion chamber in which a multiplicity of burners 107 that generate flames 156 and are disposed in the circumferential direction about a rotation axis 102 open into a common combustion chamber space 154. To this end, the combustion chamber 110 in the entirety thereof is designed as an annular structure which is positioned about the rotation axis 102.

In order for a comparatively high degree of efficiency to be achieved, the combustion chamber 110 is conceived for a comparatively high temperature of the operating medium M of approximately 1000 degrees Celsius to 1600 degrees Celsius. In order for a comparatively long operating period to be enabled even in the case of these operating parameters which are unfavorable for the materials, the combustion chamber wall 153 on that side thereof that faces the operating medium M is provided with an internal cladding formed from ceramic heat shields 155.

By virtue of the high temperatures in the interior of the combustion chamber 110, a cooling system can be provided for the heat shield elements 155, or for the holding elements thereof, respectively. The heat shield elements 155 in this instance are hollow, for example, and optionally also have cooling bores (not illustrated) which open into the combustion chamber space 154.

Figure 3:
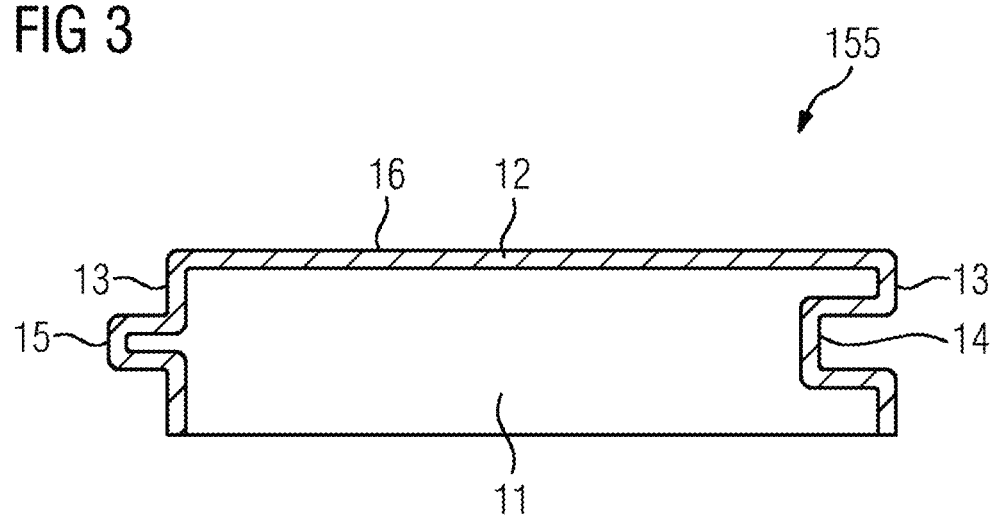
FIG. 3 shows an exemplary embodiment of a heat shield 155 according to embodiments of the invention.

FIG. 3 shows an exemplary embodiment of a ceramic heat shield 155 according to embodiments of the invention. The heat shield 155 is illustrated in a cross-sectional drawing and, only in an exemplary manner, on the lateral faces 13 thereof has a groove 14 and a tongue 15 by way of which a plurality of neighboring heat shields 155 can be connected so as to form an interior cladding. The heat shield 155 possesses a porous ceramic body 11 which according to embodiments of the invention in a surface layer 12 is equipped with an infiltration coating. The surface layer 12 in the example shown extends across the lateral faces 13 and an end face 16 of the ceramic heat shield 155, said end face 16 in the operation being exposed directly to the hot gas. The infiltration coating contains YAG and closes the pores of the ceramic body 11 such that hot gas cannot invade said pores. For example, a YAG-containing suspension can be directed across the surface of aluminum-oxide-containing ceramic body. The YAG configures the infiltration coating in the case of a subsequent firing procedure.

Figure 4:
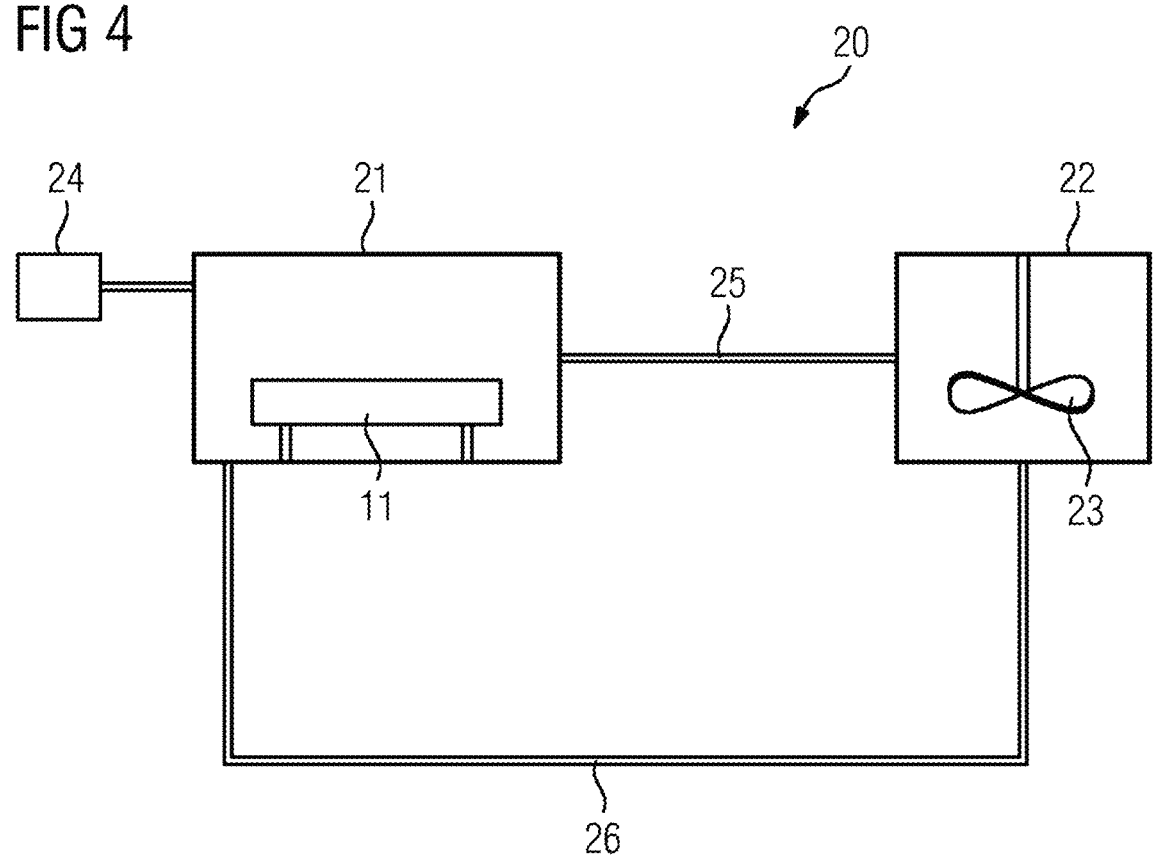
FIG. 4 shows an exemplary embodiment of a manufacturing device 20 for use in the method according to embodiments of the invention.

FIG. 4 shows an exemplary embodiment of a manufacturing device 20 used in the method according to embodiments of the invention. The exemplary manufacturing device 20 possesses a process chamber 21 in which a porous ceramic body 11, or else a plurality of such ceramic bodies 11, is/are provided. The ceramic body 11 can be masked, for example, and/or be mounted on supports. The process chamber 21 is connected to a vacuum pump 24 which can be used for placing the process chamber 21 in a vacuum after said process chamber 21 has been closed. Suspension from a reservoir 22, which contains a supply of suspension, is directed through a supply line 25 into the process chamber 21 and thus across the ceramic body 11, such that the ceramic body 11 is immersed in the suspension. The suspension is discharged again from the process chamber 21 by way of a discharge line 26, such that an approximately consistent filling level of suspension is established in the process chamber for the duration of carrying out the immersion of the ceramic body in the suspension. The reservoir 22 herein can have a mixer 23 which ensures a uniform mixing of the suspension such that ideally no particles of the infiltration coating material within the reservoir 22 are discharged, which would cause a variable concentration of the infiltration coating material in the suspension. The supply line of the suspension is interrupted after a predetermined temporal duration has elapsed, and the quantity of suspension present in the process chamber 21 is directed back into the reservoir. The ceramic body 11 can still remain in the process chamber for a dwell time and thereby dry. However, it is also possible for said ceramic body 11 to be retrieved directly after the discharge of the suspension and to be mechanically relieved of any suspension adhering to the surface. In order for the degree of infiltration to be increased, as a further variant, the chamber after the evacuation using a vacuum can be subsequently impinged with a pressure of 1 bar, or in a further cycle being impinged with up to 5 bar, so as to achieve a complete infiltration of the bricks. The ceramic body 11 is subsequently fired so as to form a heat shield, wherein the infiltration coating material that has been drawn into the pores of the ceramic body 11 is fixedly connected to the ceramic body 11 and in this way configures the desired advantageous infiltration coating.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A ceramic heat shield for a gas turbine, comprising:
a porous ceramic body, including a surface, a surface layer and pores, wherein the porous ceramic body comprises mullite; and
an infiltration coating which is infiltrated and penetrated into the surface layer of the porous ceramic body, which includes yttrium aluminum garnet that is configured for closing the pores of the surface layer of the porous ceramic body, and which has been fired in a firing procedure to establish a crystalline compound with the porous ceramic body and yttrium aluminum garnet and reactive phases, transition phases and dendrites between the porous ceramic body and the infiltration coating, wherein the infiltration coating does not extend past the surface of the porous ceramic body.

2. The ceramic heat shield of claim 1, wherein the porous ceramic body consists substantially of mullite.

3. The ceramic heat shield of claim 1, wherein the infiltration coating material consists substantially of yttrium aluminum garnet.

4. The ceramic heat shield as claimed in claim 1, wherein the infiltration coating is at least 10 µm thick and up to 600 µm thick.

5. The ceramic heat shield as claimed in claim 1, wherein the surface layer extends across an end face and across lateral faces of the porous ceramic body.

6. The ceramic heat shield as claimed in claim 1, wherein the infiltration coating comprises a thickness of 400 µm.

7. A gas turbine or a combustion chamber having a ceramic heat shield as claimed in claim 1.

8. A method for producing a ceramic heat shield for a gas turbine, comprising the following method steps:

providing a porous ceramic body, wherein the porous ceramic body comprises mullite;

generating an infiltration coating in a surface layer of the porous ceramic body, wherein the infiltration coating contains an infiltration coating material which is configured for closing pores of the porous ceramic body in a gas-tight manner, wherein the infiltration coating does not extend past the surface of the porous ceramic body, wherein the infiltration coating material comprises yttrium aluminum garnet, and wherein the generating of the infiltration coating includes immersing the porous ceramic body in a suspension containing the infiltration coating material and firing the porous ceramic body to establish a crystalline compound with the porous ceramic body and yttrium aluminum garnet and reactive phases, transition phases and dendrites between the porous ceramic body and the infiltration coating.

9. The method as claimed in claim 8, comprising a step of masking part of a surface of the porous ceramic body prior to immersing the porous ceramic body in the suspension.

10. The method as claimed in claim 8, wherein one or a plurality steps of preparing the suspension comprises/comprise a step of melting and stabilizing the melt of the infiltration coating material.

11. The method as claimed in claim 10, wherein the step of preparing the suspension comprises a step of grinding the infiltration material to at least one of the sub-micrometer range, a particle size ≤1 µm, and 500 nm to 100 nm.

12. The method as claimed in claim 8, wherein the infiltration is performed at a plurality of cycles.

13. The method as claimed in claim 8, wherein an overcoating of the infiltrated region is performed.

14. The method as claimed in claim 8, wherein the infiltration is performed at a positive pressure of up to 5 bar.

15. A refurbishment method comprising the following steps:

removing at least one existing ceramic heat shield from a gas turbine; and installing a replacement ceramic heat shield in the gas turbine, the replacement ceramic heat shield comprising:

a porous ceramic body, including a surface, a surface layer and pores, wherein the porous ceramic body comprises mullite; and an infiltration coating which is infiltrated and penetrated into the surface layer of the porous ceramic body, which includes yttrium aluminum garnet that is configured for closing the pores of the surface layer of the porous ceramic body, and which has been fired in a firing procedure to establish a crystalline compound with the porous ceramic body and yttrium aluminum garnet and reactive phases, transition phases and dendrites between the porous ceramic body and the infiltration coating, wherein the infiltration coating does not extend past the surface of the porous ceramic.

* * * * *